(12) United States Patent
Wu et al.

(10) Patent No.: US 7,241,331 B2
(45) Date of Patent: Jul. 10, 2007

(54) METAL HYDRIDE CANISTER APPARATUS

(75) Inventors: Chou-Zong Wu, Hsinchu (TW); Chi-Tang Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 10/805,271

(22) Filed: Mar. 22, 2004

(65) Prior Publication Data

US 2005/0103196 A1    May 19, 2005

(30) Foreign Application Priority Data

Nov. 18, 2003   (TW) .............................. 92132204 A

(51) Int. Cl.
*B01D 53/02* (2006.01)
(52) U.S. Cl. ...................... 96/134; 96/146; 165/104.12
(58) Field of Classification Search ................... 96/134, 96/146, 108; 206/0.7; 165/104.12; 62/46.2
See application file for complete search history.

(56) References Cited

U.S. PATENT DOCUMENTS 4,548,044 A * 10/1985 Sakai et al. ................... 62/46.2
5,082,048 A * 1/1992 Iwaki et al. ............ 165/104.12

\* cited by examiner

*Primary Examiner*—Robert Hopkins
(74) *Attorney, Agent, or Firm*—Troxell Law Office, PLLC

(57) ABSTRACT

The present invention provides a metal hydride canister apparatus having structures capable of discharging hydrogen gas uniformly and exchanging heat effectively, comprising: a shell having a joint arranged in a central hole located on top of the shell, and two via holes arranged respectively at a side of the central hole; a filtering rod connecting to the joint; a pipe having a first end, a second end and a middle section between the first end and the second end; and a metal hydride stored inside the shell; wherein, the first end and the second end of the pipe pass the corresponding via hole in respective, and the middle section of the pipe forms a twin spiral structure wrapping around the filtering rod, the middle section having a first loop interconnecting to a second loop. In a preferred embodiment of the present invention, the filtering rod can be a hollow rod extending toward the bottom of the shell, and is welded on the joint that is further welded to the central hole, in addition, the first end and the second end of the pipe are welded onto the corresponding via holes and are exposed to the outside of the shell, and the first loop and the second loop of the middle section can have equal diameters or different diameters.

4 Claims, 5 Drawing Sheets

METAL HYDRIDE CANISTER APPARATUS

FIELD OF THE INVENTION

The invention is related to a metal hydride canister apparatus, and more particularly, to a metal hydride canister apparatus having structures capable of discharging hydrogen gas uniformly and exchanging heat effectively.

BACKGROUND OF THE INVENTION

A fuel cell provides electricity and heat at the same time by electrochemically reacting a fuel gas such as hydrogen with an oxidant gas such as air in catalytic layers of electrodes. Fuel cells offer the possibility of converting chemically bonded energy directly into electrical energy which can be subsequently converted into mechanical drive energy with the aid of an electric motor. Present day preferred fuel cells consume hydrogen and oxygen and convert these elements into the environmentally friendly end product, namely, water.

Hydrogen is the most direct fuel of fuel cell, that is, it can be used without the conversion of reformer. Hydrogen is a substance with high energy content compared to its weight. On the other hand, the energy content compared to volume is rather low. This poses greater challenges with respect to storage compared to storage of gasoline which is a liquid. There are basically three options:

- hydrogen may be compressed and stored in a pressure tank, such as high-pressure hydrogen storage steel bottle.
- hydrogen may be cooled to a liquid state and kept cold in a properly insulated tank, such as liquid hydrogen storage tank.
- hydrogen may be stored in a solid compound, such as metal hydride canister and carbon nanofibers.

With respect to storing density, convenience, safety, and cost, the metal hydride canister will be the preferred option.

FIG. 1 is a cross-sectional view illustrating a metal hydride tank apparatus according to ROC Pat. No. 491336. Please refer to FIG. 1, the metal hydride tank apparatus 100 mainly comprises: a metal hydride 102, a shell 104 containing the metal hydride 102, a gas-valve controlling unit 106, and a heat exchanger 108 arranged inside the shell 104, wherein, the top of the shell 104 has an opening 110 having two holes (not shown) arranged at the circumferential surface thereof, and the gas-valve controlling unit 106 is arranged within the opening 110.

As seen in FIG. 1, the heat exchanger 108 further comprises: a first end 112 passing through one of the hole arranged at the circumferential surface of the opening 110; a second end 116 passing through another hole arranged at the circumferential surface of the opening 110; and a single spiral shaped middle section 114 located inside the shell 104. Therefore, when it is desired to promote an exothermic reaction in the metal hydride 102 for storing hydrogen or to promote an endothermic reaction in the metal hydride 102 for discharging hydrogen, the crooked spiral-shaped middle section of the heat exchanger 108 having a large surface contacting with the metal hydride 102 is capable of speeding up the reaction. The gas-valve controlling unit 106 of the prior metal hydride tank apparatus 100 further has a filter 118, and the filter 118 is made of palladium using powder sinter molding method, for allowing the flowing of hydrogen and filtering out other gases and impurities.

However, during the hydrogen absorbing and discharging procedures, the conventional metal hydride tank apparatus is not ideal for the following reasons:

1. When hydrogen quickly enters into and exhausts from the conventional metal hydride tank apparatus, the flow rate of the hydrogen will be quickly slowed down, because of the heat absorption and the heat release of the metal hydride.

2. If the thickness of the filter is not thick enough, then the ability for filtering out the impurities and other gases will be insufficient.

3. If the thickness of the filter is too thick, then the resistance for discharging the hydrogen will be increased.

4. Because the contact area between the single spiral pipe of the heat exchanger and the metal hydride is not large enough, it is impossible to heat the metal hydride uniformly or absorb the heat released by the metal hydride uniformly, such that the hydrogen absorbing and discharging capability of the metal hydride is affected.

SUMMARY OF THE INVENTION

The object of the present invention is to provide a metal hydride canister apparatus having structures capable of discharging hydrogen gas uniformly and exchanging heat effectively, and the apparatus also can effectively filter out impurities and prevent the finer powder of the degraded metal hydride from leaking.

Another object of the present invention is to provide a metal hydride canister apparatus having structures capable of discharging hydrogen gas uniformly and exchanging heat effectively, such that not only the apparatus is able to maintain a constant flow rate within a specific period of time, but also may enable a larger hydrogen discharging flow rate.

Yet, another object of the present invention is to provide a metal hydride canister apparatus having structures capable of discharging hydrogen gas uniformly and exchanging heat effectively, such that the apparatus can heat the metal hydride uniformly or absorb the heat released by the metal hydride uniformly for enhancing hydrogen absorbing and discharging capability of the metal hydride.

To reach the aforementioned objects, the present invention provides a metal hydride canister apparatus, comprising: a shell having a joint arranged in a central hole located on top of the shell, and two via holes arranged respectively at a side of the central hole; a filtering rod connecting to the joint; a pipe having a first end, a second end and a middle section between the first end and the second end; and a metal hydride stored inside the shell; wherein, the first end and the second end of the pipe pass the corresponding via hole in respective, and the middle section of the pipe forms a twin spiral structure wrapping around the filtering rod, the middle section having a first loop interconnecting to a second loop. In a preferred embodiment of the present invention, the filtering rod can be a pipe extending toward the bottom of the shell, and is welded on the joint that is further welded to the central hole, in addition, the first end and the second end of the pipe are welded onto the corresponding via holes and are exposed to the outside of the shell, and the first loop and the second loop of the middle section can have equal diameters or different diameters. The shell can be made of stainless steel or aluminum alloy. The metal hydride can be lanthanum alloy.

In a preferred embodiment, a heat medium is input from the first end of the pipe and is then flowing out of the second end, or vice versa. On the other hand, a cold medium is input from the first end of the guiding pipe and is then flowing out of the second end of the pipe, or vice versa.

In a preferred embodiment, the filtering rod can be made of sintered powder stainless steel, since the sintered powder stainless steel has plenty of micro-holes therein, the diameter of which is around 0.1~1.0 micrometer, and the micro-holes may be adapted as channels for the hydrogen to pass and also have function of filtering out impurities.

In a preferred embodiment, the filtering rod is a plurality of stainless steel pipes weld-connecting head to tail with a piece of sintered powder stainless steel in between.

In a preferred embodiment, the filtering pipe is made of a stainless steel pipe having a plurality of through holes penetrating the stainless steel pipe and, corresponding to the inner diameters of these small through holes, plural filtering nets may be arranged, and the material of these nets includes stainless steel.

The aforementioned formations of the filtering rod according to the present invention all may filter out impurities and other gases such that the hydrogen stored in the metal hydride is highly purified. Moreover, the present invention may also apply the waste heat generated by the fuel cell to heat the metal hydride.

Following drawings are cooperated to describe the detailed structure and its connective relationship according to the invention for facilitating your esteemed members of reviewing committee in understanding the characteristics and the objectives of the invention.

DETAILED DESCRIPTION OF THE INVENTION

For your esteemed members of reviewing committee to further understand and recognize the fulfilled functions and structural characteristics of the invention, a preferable embodiment cooperating with detailed description is presented as the follows.

Figure 1:
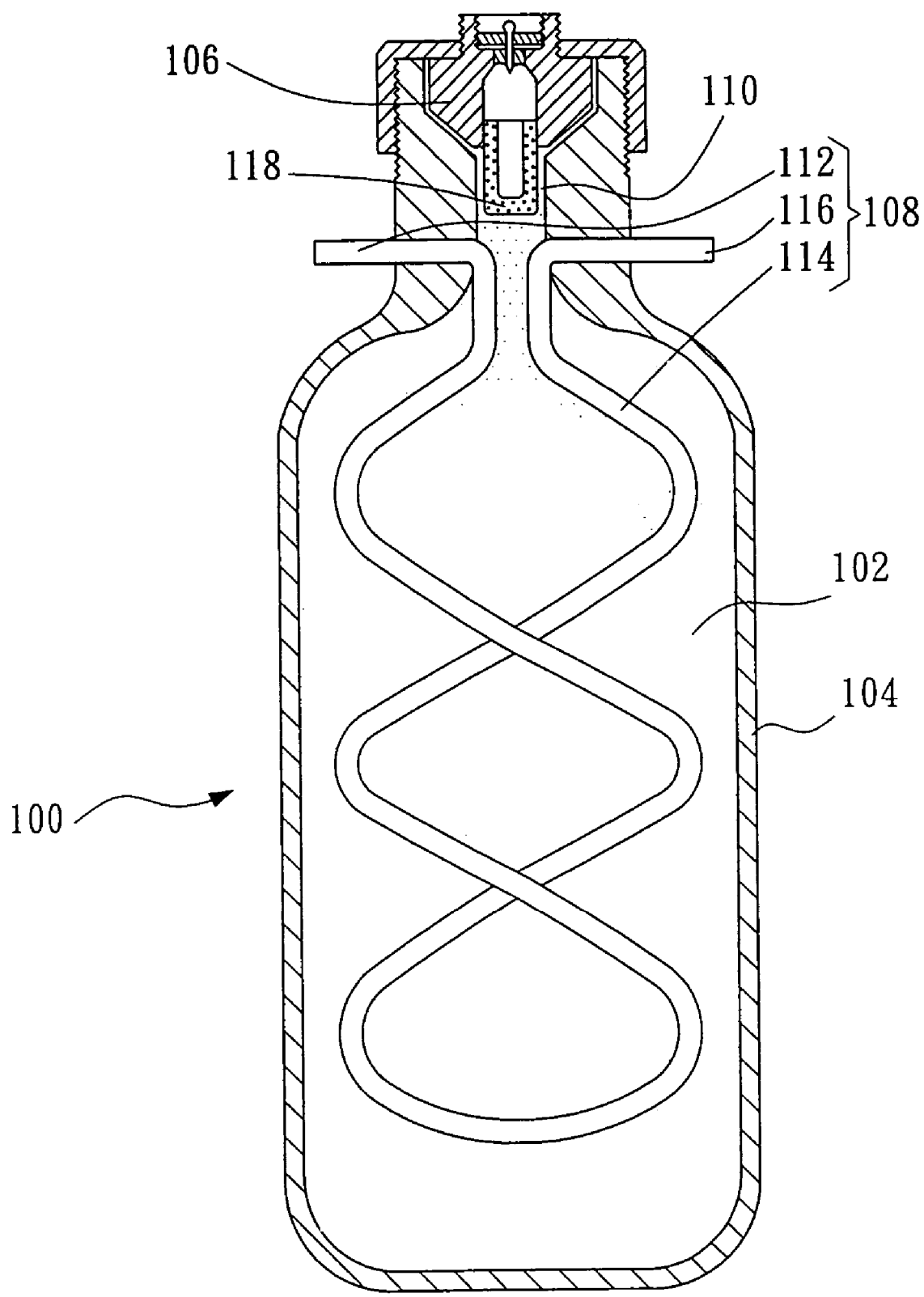
FIG. 1 is a cross-sectional view illustrating a metal hydride canister apparatus disclosed in ROC Pat. No. 491336.
Figure 2:
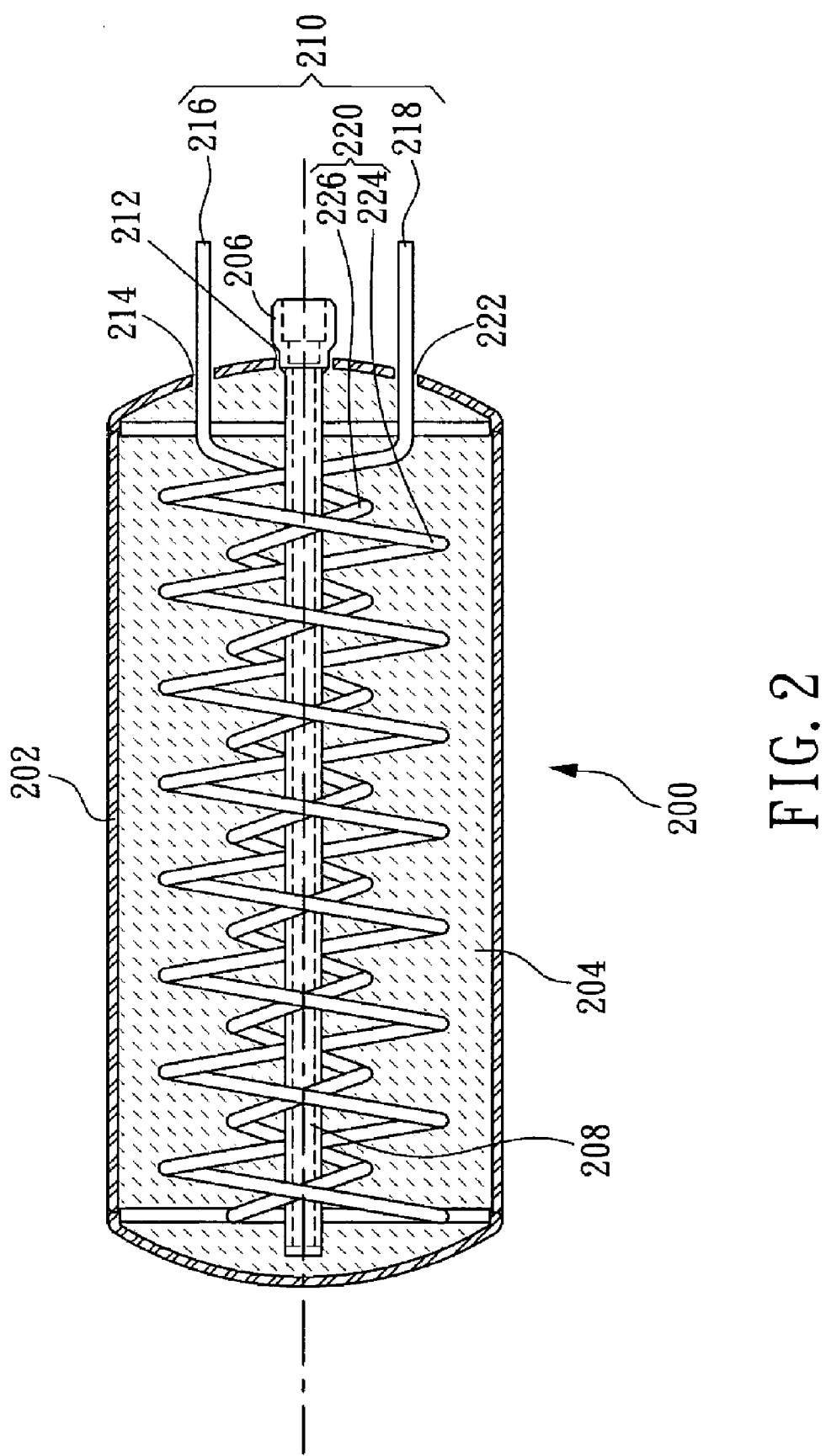
FIG. 2 is a cross-sectional view illustrating a preferred embodiment of a metal hydride canister apparatus having structures capable of discharging hydrogen gas uniformly and exchanging heat effectively according to the present invention.

Please refer to FIG. 2, which is a cross-sectional view illustrating a preferred embodiment of a metal hydride canister apparatus having structures capable of discharging hydrogen gas uniformly and exchanging heat effectively according to the present invention. As seen in FIG. 2, the metal hydride canister apparatus 200 is adapted for connecting to a hydrogen-filling apparatus (not shown) or a fuel cell (not shown). In the present embodiment, the apparatus 200 mainly comprises: a shell 202, a filtering rod 208, and a guiding pipe 210. Wherein, the top of the shell 202 has a central hole 212 and a connector 206, which is arranged in the central hole 212, and the connector 206 and the shell 202 may be connected by means of welding. In the present embodiment, the metal hydride canister apparatus 200 further has a metal hydride 204, which is arranged in the shell 202. Two sides of the central hole 212 of this embodiment have two corresponding passing holes 214, 222, and the metal hydride 204 is filled in the interior of the shell 202. One side of the filtering rod 208 is connected to the connector 206 and the connecting method may be welding as well. Another side is extended over the bottom of the shell 202. The filtering rod 208 may be formed as a pipe shape. The guiding pipe 210 has a first end 216, a second end 218, and a middle section 220 connected to the first end 216 and the second end 218, both of which respectively pass through two passing holes 214, 222 and may be fixed thereto by welding method and are exposed to the outside of the shell 202 as well. In this embodiment, the middle section 220 is located in the interior of the shell 202 and formed as a twin spiral structure, which has a first ring 224 and a second ring 226, which are interconnected, and their diameters may be equal or may be not. Furthermore, the twin spiral structure surrounds the filtering rod 208 to make the filtering rod 208 pass through the area surrounded by the guiding pipe 210, and the middle section 220 is also extended over the bottom of the shell 202.

As seen in FIG. 2, the general materials of the shell 202 may be stainless steel or aluminum alloy and it is formed substantially as column shape. In this embodiment, the metal hydride 204 may be lanthanum alloy and its hydrogen storage ability may reach 1.5 wt %. The hydrogen storage density of lanthanum alloy is lower than other alloy's, but its reacting temperature and pressure for discharging hydrogen are medium, so its reacting speed is faster than other metal hydride's. The connector 206 is arranged in the central hole 212 of the shell 202, and its one side is connected to electromagnetic valve and pipe (not shown), while another side is connected to the filtering rod 208. The side connected to the electromagnetic value and pipe may decide the hydrogen to be flowed into or to be flowed out of the metal hydride canister apparatus 200.

Figure 3:
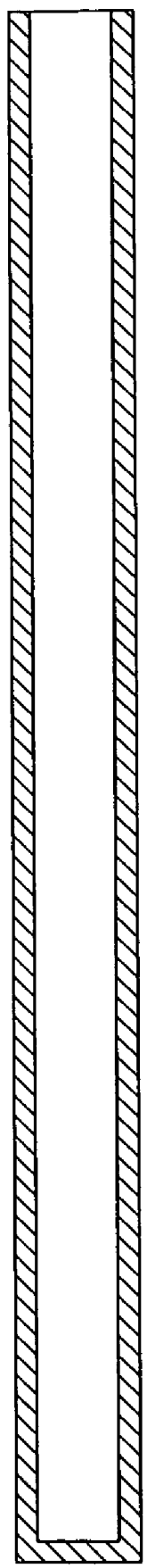
FIG. 3 is a cross-sectional view illustrating a sintered filtering rod of the metal hydride canister apparatus having structures capable of discharging hydrogen gas uniformly and exchanging heat effectively according to a preferred embodiment of the present invention.

Please refer to FIG. 3, which is a cross-sectional view illustrating a sintered filtering rod of the metal hydride canister apparatus having structures capable of discharging hydrogen gas uniformly and exchanging heat effectively according to a preferred embodiment of the present invention. As seen in FIG. 3, the filtering rod 208 of this embodiment is mainly made of stainless steel powder and formed by sintering process, so the surface of the filtering rod 208 has many invisible micro-holes, diameters of which are around 0.1~1.0 micrometers. Although its surface has many micro-holes, the filtering rod 208 still has considerable strength to resist the flowing pressure of the hydrogen during hydrogen discharging/absorbing processes. Therefore, when the metal hydride 204 processes hydrogen-absorbing reaction, the hydrogen passing through the filtering rod 208 also has the function of filtering impurities as well. After the metal hydride canister apparatus 200 is used a while, the metal hydride 204 will be degraded and powdered. At this time, if the metal hydride 204 proceeds hydrogen-discharging action, the filtering rod 208 may also prevent the powder from entering the hydrogen flow to influence the performance of fuel cell.

As seen in FIG. 2 and FIG. 3, the first end 216 and the second end of the guiding pipe 210 of this embodiment respectively pass through two passing holes 214, 222 of the shell 202 to be connected to the external hot source or cold source (not shown), while the middle section 220 connecting the first end 216 and the second end 218 is located in the interior of the shell 202 and is shown as a twin spiral structure. The middle section 220 is comprised of a first ring 224 and a second ring 226, and both diameters may be equal or not. The objective of this twin spiral structure is to increase the contacting surface between the guiding pipe 210 and the metal hydride 204. In order to accelerate the hydrogen-discharging (heat-absorbing) reaction or hydrogen-absorbing (heat-discharging) reaction, hot source or cold source is input from the first end 216. For example, the waste heat generated by the fuel cell may be input from the first end, passes through the curved guiding pipe 210, and flows out from the second end 218. One thing is worthy of noticing: since the middle section 220 is a twin spiral structure surrounding the filtering rod 208 so, when the metal hydride 204 proceeds hydrogen-discharging reaction, because of the heat transfer of the middle section 220 of the guiding pipe 210, the temperature of the metal hydride 204 is easily increased to quickly extract the hydrogen from the interior of the filtering rod 208 through the micro-holes of the surface of the filtering rod 208. Or, when filling the hydrogen, the temperature of the metal hydride 204 is lowered down such that, after being overflowed from the micro-holes of the surface of the filtering rod 208, the hydrogen may be quickly combined with the metal hydride 204 to be stored in the hydrogen apparatus 200. In other words, the hot source may be input from the first end 216 or the second end 218 and output from the second end 218 or the first end 216, or the cold source may be input from the first end 216 or the second end and again output from the second end or the first end for the purpose of aiding the actions of hydrogen storage or hydrogen release.

Figure 4:
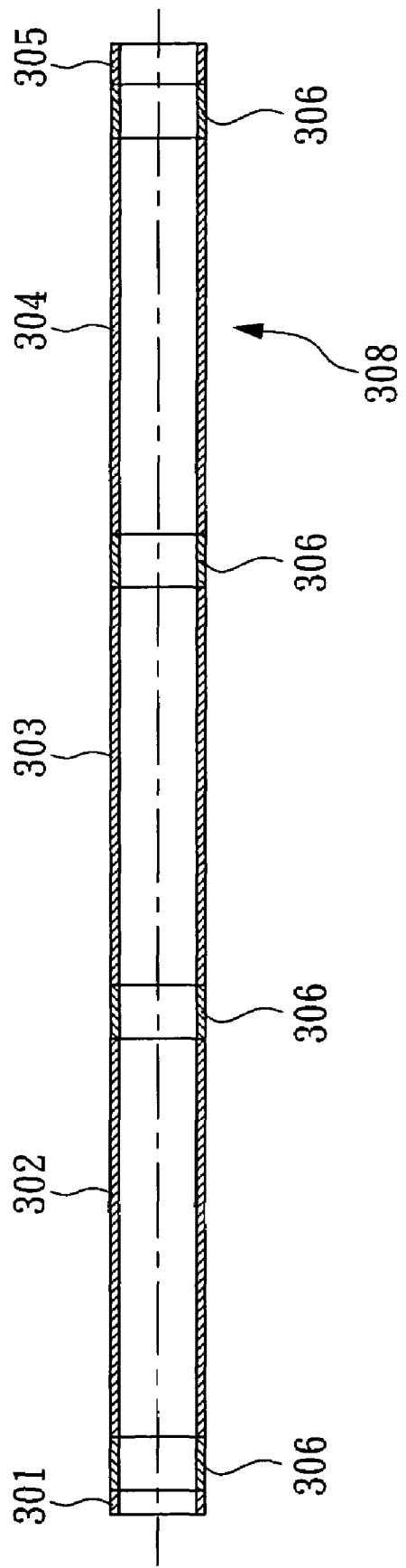
FIG. 4 is a cross-sectional view illustrating a metal hydride canister apparatus having a filtering rod constructed using a plurality of weld-connected stainless steel pipes according to a preferred embodiment of the present invention.

Please refer to FIG. 4, which is a cross-sectional view illustrating a metal hydride canister apparatus having a filtering rod constructed using a plurality of weld-connected stainless steel pipes according to a preferred embodiment of the present inventions. As seen in FIG. 4, wherein the filtering rod 308 is similar to aforementioned filtering rod 208. The difference is that, in this embodiment, small sections of sintered filtering rod 306 are welded between multiple sections of stainless steel pipe materials 301, 302, 303, 304, and 305. Except for acting as paths of hydrogen, the filtering rod 308 also has the function of filtering impurities and other gases.

Figure 5:
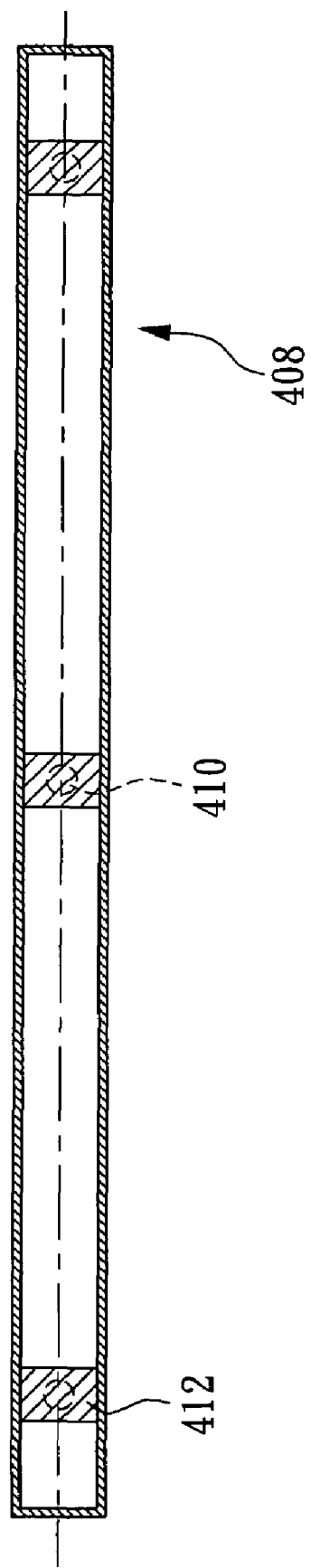
FIG. 5 is a cross-sectional view illustrating a metal hydride canister apparatus having a filtering rod with a plurality of through hole on the surface thereof according to a preferred embodiment of the present invention.

Please refer to FIG. 5, which is a cross-sectional view illustrating a metal hydride canister apparatus having a filtering rod with a plurality of through hole on the surface thereof according to a preferred embodiment of the present invention. As seen in FIG. 5, wherein the filtering rod 408 is similar to the aforementioned filtering rod 208. The difference is that, in this embodiment, the entire piece of filtering rod 408 is made of stainless steel pipe materials, the surface of which has many small holes 410 and, corresponding to the internal diameters of these small holes 410, multiple foldable filtering nets 412 are arranged, and the material of the filtering net may be stainless steel. Similarly, except for acting as paths of hydrogen, the filtering nets 412 and the small holes 410 of this embodiment also has the function of filtering impurities and other gases.

The followings are experimental data according to the embodiments of the present invention, including the hydrogen-discharging speed tests after the twin spiral-guiding pipe, the single spiral-guiding pipe, and no guiding pipe are heated.

| Twin Spiral-Guiding Pipe | | Single Spiral-Guiding Pipe | | No Guiding Pipe | |
|---|---|---|---|---|---|
| Time (Minute) | Liter/Minute | Time (Minute) | Liter/Minute | Time (Minute) | Liter/Minute |
| 1 | 18.25 | 1 | 18.2 | 1 | 14.8 |
| 2 | 18.26 | 2 | 18.12 | 2 | 12.6 |
| 3 | 18.21 | 3 | 13.8 | 3 | 9.3 |
| 4 | 18.23 | 4 | 12.8 | 4 | 6.6 |
| 5 | 18.26 | 5 | 12.2 | 5 | 5.7 |
| 6 | 18.18 | 6 | 12.2 | 6 | 4.69 |
| 8 | 18.16 | 8 | 11.56 | 8 | 3.19 |
| 9 | 18.17 | 9 | 11.7 | 9 | 3 |
| 10 | 18.15 | 10 | 11.55 | 10 | 2.7 |
| 12 | 18.15 | 12 | 11.3 | 12 | 2.3 |
| 13 | 18.15 | 13 | 11.2 | 13 | 2.1 |
| 15 | 18.17 | 15 | 11.1 | 15 | 1.97 |
| 17 | 18.15 | 17 | 10.9 | 17 | 1.86 |
| 19 | 18.17 | 19 | 10.8 | 19 | 1.69 |
| 23 | 18.17 | 23 | 10.5 | 23 | 1.51 |
| 25 | 18.17 | 25 | 10.4 | 25 | 1.46 |
| 27 | 18.16 | 27 | 10.19 | 27 | 1.4 |
| 29 | 18.16 | 29 | 10.18 | 29 | 1.36 |
| 31 | 18.16 | 31 | 10.2 | 31 | 1.33 |
| 33 | 17.9 | 33 | 10.2 | 33 | 1.3 |
| 35 | 17.5 | 35 | 10 | 35 | 1.29 |
| 37 | 16.6 | 37 | 9.6 | 37 | 1.29 |
| 39 | 16.3 | 39 | 9.6 | 39 | 1.29 |
| 41 | 16 | 41 | 9.6 | 41 | 1.29 |
| 43 | 15.6 | 43 | 9.3 | 43 | 1.29 |
| 45 | 15.2 | 45 | 9.1 | 45 | 1.29 |
| 47 | 15 | 47 | 8.8 | 47 | 1.28 |
| 49 | 14.9 | 49 | 8.7 | 49 | 1.28 |

From above data, it is known that, when the twin spiral-guiding pipe is heated, its time is longer and it is more stable. Again, the hydrogen-discharging amounts of the filtering rods, of this embodiment, made of powder metallurgic pipe material and foldable filtering net, are listed respectively as follows.

| Powder Metallurgic Pipe | | Foldable Filtering Net | |
|---|---|---|---|
| psig | Liter/Minute | psig | Liter/Minute |
| 0.42 | 6.5 | 2.63 | 4.2 |
| 0.5 | 7.6 | 3.23 | 6.5 |
| 0.64 | 9.9 | 4.23 | 6.7 |
| 0.86 | 12.8 | 5.37 | 8.8 |
| 1.03 | 14.6 | 5.9 | 11.2 |
| 1.31 | 16.5 | 6.5 | 12 |
| 1.49 | 19.3 | 7 | 13.3 |
| 1.6 | 21.4 | 7.5 | 14 |
| 1.7 | 21.8 | 7.75 | 15.1 |
| 1.9 | 25.5 | 8.2 | 16 |
| | | 12.3 | 23.5 |

Therefore, from above experimental data, it is known that the hydrogen-discharging amount of the filtering rod made of powder metallurgy is superior to that of the stainless pipe material, surface of which has many small holes and, corresponding to the internal diameters of the small holes, foldable filtering nets are arranged.

In the aforementioned preferable embodiments, a filtering rod and a guiding pipe with twin spiral structure are arranged to filter impurities and accelerate the speeds of hydrogen-discharging and hydrogen-absorbing processes. However, the aforementioned embodiments are applied for description only and not for restricting the formations of the filtering rod and the guiding pipe according to the invention, so those who are skilled in such arts should infer that the filtering rod according to the invention may also be any other geometrical configuration. Similarly, when the metal hydride proceeds with the hydrogen-absorbing (heat-discharging) process, the metal hydride canister apparatus may be placed in cold water to accelerate the hydrogen-absorbing reaction.

In summarizing aforementioned description, the metal hydride canister apparatus with uniform hydrogen release and effectively heat-exchanging structure according to the invention at least has following advantages:

1. The metal hydride canister apparatus according to the invention has a filtering rod of sintered powder metal, not only does it possess the function of filtering out impurities, but also may it prevent the powder of the degraded metal hydride from entering the fuel cell.

2. The metal hydride canister apparatus according to the present invention has a filtering rod made by connecting a plurality of stainless steel pipes, between which a sintered stainless steel materials are welded such that, not only does it have the function of filtering out impurities, but also may it lower down the cost.

3. The metal hydride canister apparatus according to the present invention has a guiding pipe formed as twin spiral structure, such that the contacting area with the metal hydride is increased, the speeds of hydrogen-discharging/hydrogen-absorbing reactions are increased, and the time of hydrogen-discharging/hydrogen-absorbing reactions is saved.

4. In the metal hydride canister apparatus according to the present invention, because a stable distance is kept between the filtering rod and the guiding pipe formed as twin spiral structure, the speeds of hydrogen-discharging/hydrogen-absorbing reactions of the metal hydride are kept stable.

5. In the same shell of the metal hydride canister apparatus according to the present invention, not only the surface area of the guiding pipe formed as twin spiral structure is larger than that of the guiding pipe formed as single spiral structure, but also the volume of the former is smaller than that of the latter, such that the apparatus with the guiding pipe formed as twin spiral structure may store more metal hydride to further store more hydrogen.

6. In the metal hydride canister apparatus according to the present invention, the hot source heating the metal hydride is the waste heat recovered from the fuel cell, such that additional cost may be saved.

However, the aforementioned description is only the preferable embodiments according to the invention and, of course, can not be applied as a limitation to the field of the invention, and any equivalent variation and modification made according to the claims claimed thereinafter still possess the merits of the invention and are still within the spirits and the ranges of the invention, so they should be deemed as a further executing situation of the invention.

What is claimed is:

1. A metal hydride canister apparatus having structures capable of discharging hydrogen gas uniformly and exchanging heat effectively, comprising:
   a shell, having a connector arranged in a central hole located on top of the shell, and a plurality of passing holes arranged around the central hole;
   a filtering rod, one end thereof connected to the connector, and the other end thereof extending toward the bottom of the shell; and
   a guiding pipe, having a first end, a second end, and a middle section between the first end and the second end;
   wherein, the first end and the second end of the pipe pass the corresponding passing holes in respective and are exposed to the outside of the shell, and the middle section of the pipe forming a twin spiral structure wraps around the bottom-extending filtering rod and is arranged inside the shell,
   wherein the filtering rod is a plurality of stainless steel pipes weld-connecting head to tail with a piece of sintered powder stainless steel in between.

2. A metal hydride canister apparatus having structures capable of discharging hydrogen gas uniformly and exchanging heat effectively, comprising:
   a shell, having a connector arranged in a central hole located on top of the shell, and a plurality of passing holes arranged around the central hole;
   a filtering rod, one end thereof connected to the connector, and the other end thereof extending toward the bottom of the shell; and
   a guiding pipe, having a first end, a second end, and a middle section between the first end and the second end;
   wherein, the first end and the second end of the pipe pass the corresponding passing holes in respective and are exposed to the outside of the shell, and the middle section of the pipe forming a twin spiral structure wraps around the bottom-extending filtering rod and is arranged inside the shell,
   wherein the filtering rod is made of a stainless steel pipe having a plurality of through holes penetrating the stainless steel pipe and, corresponding to the inner diameters of these through holes, plural filtering nets may be arranged.

3. The metal hydride canister apparatus of claim 2, wherein the filtering net is made of stainless steel.

4. A metal hydride canister apparatus having structures capable of discharging hydrogen gas uniformly and exchanging heat effectively, comprising:
   a shell, having a connector arranged in a central hole located on top of the shell, and a plurality of passing holes arranged around the central hole;
   a filtering rod, one end thereof connected to the connector, and the other end thereof extending toward the bottom of the shell; and
   a guiding pipe, having a first end, a second end, and a middle section between the first end and the second end;
   wherein the first end and the second end of the pipe pass their corresponding passing holes and are exposed to the outside of the shell, and the middle section of the pipe forming a twin spiral structure wraps around the bottom-extending filtering rod and is arranged inside the shell, the twin spiral structure has a first loop interconnecting to a second loop, and the diameter of the first loop is less than that of the second loop.

* * * * *